United States Patent [19]

Heinrich et al.

[11] Patent Number: 4,764,273
[45] Date of Patent: Aug. 16, 1988

[54] FILTER PRESS GUIDE DEVICE

[75] Inventors: Hans J. Heinrich, Ennepetal; Max Oelbermann, Remscheid; Ernst-Gerhard Hohmann, Wuppertal, all of Fed. Rep. of Germany

[73] Assignee: Rittershaus & Blecher GmbH, Wuppertal, Fed. Rep. of Germany

[21] Appl. No.: 19,698

[22] Filed: Feb. 27, 1987

[30] Foreign Application Priority Data

Feb. 27, 1986 [DE] Fed. Rep. of Germany ....... 3606301

[51] Int. Cl.$^4$ .............................................. B01D 25/15
[52] U.S. Cl. ................................... 210/225; 210/230; 210/231
[58] Field of Search ............................. 210/224–231; 100/194–206

[56] References Cited

U.S. PATENT DOCUMENTS

| 4,105,559 | 8/1978 | Busse et al. | 210/225 |
| 4,159,249 | 6/1979 | Schotten | 210/230 |
| 4,172,793 | 10/1979 | Delbermann et al. | 210/231 |
| 4,351,725 | 9/1982 | Rademacher et al. | 210/231 |
| 4,600,509 | 7/1986 | Sato | 210/230 |

FOREIGN PATENT DOCUMENTS

| 2920385 | 11/1980 | Fed. Rep. of Germany | 210/230 |
| 2349352 | 11/1977 | France . | |
| 415186 | 8/1934 | United Kingdom . | |
| 424502 | 2/1935 | United Kingdom . | |
| 800724 | 9/1958 | United Kingdom | 210/230 |

Primary Examiner—Richard V. Fisher
Assistant Examiner—Richard D. Jordan
Attorney, Agent, or Firm—Antonelli, Terry & Wands

[57] ABSTRACT

A filter press with central suspension of filter plates (5) is provided with a guide which ensures a flush alignment of adjacent filter plates, said guide lying outside the area affected by the filter medium, being integrated in a spacesaving manner into the filter press, and permitting a certain amount of twisting or other overall adjustment of the filter plate package. For this purpose, the guide device is disposed on the filter plate suspension (9, 10, 18, 25) and is composed of at least one guide rod (19, 20) which is flexible to a limited elastic degree, and runs along guide members (1, 2), and of at least one guide element (21, 22) for each filter plate (5) fitting around guide rod (19, 20), said elements being disposed on yoke piece (25) which supports rollers (19, 10) of the filter plate suspension.

10 Claims, 2 Drawing Sheets

FILTER PRESS GUIDE DEVICE

BACKGROUND OF THE INVENTION

The invention relates to a filter press whose filter plates and end plate are centrally suspended at the lower, for example, inner flanges, by two parallel double T-shaped guide members supported by support pillars by two rollers mounted opposite a plane of the filter plate and staggered alternately in opposite directions, on a yoke piece fastened to the top of the filter plates, and which is equipped with a guide device to prevent the filter plate from swinging.

In, for example, German Pat. No. 11 09 647, the guide device consists of rigid rods, for example tension rods, on which the filter plates, fitted with sliders or rollers, directly rest. It is known in this connection to dispose these guide rods either in the vicinity of the lower filter plate corners or halfway up the height of the plates or in the vicinity of the upper filter plate corners. However, at these points, the guide rods frequently interfere with operation and the guides are also exposed to attack from the filter medium, which is disadvantageous especially in the case of corrosive filter media. In addition, the provision of sliders or rollers on the filter plates requires separate, relatively costly machining. In addition, there is frequently insufficient play provided to the filter plate package for a certain overall shape. Especially in the case of the filter plates which are increasingly in use today, often more than five square meters in size, which are assembled at very high pressures. As a result of irregularities in the filter plates spanned by filter cloth, forces build up which are directed toward an overall lifting of the filter plate package or a twisting of the filter plate package. In the case of rigid guides therefore, this can lead to destruction of the guides or to breakage of the filter plates.

The aim underlying the invention essentially resides in providing a filter press with a guide which ensures flush alignment of adjacent filter plates, with the guide being located outside the area affected by the filter medium, and being integrated in a space-saving manner in the filter press, while also allowing a certain twisting or other overall adjustment of the filter plate package.

On the basis of a filter press of the type described above, the solution to this problem is achieved according to the invention by virtue of the fact that the guide device is disposed on the filter plate suspension and include at least one guide rod running along the guide member and being elastically flexible to a limited degree, and each yoke piece is provided with at least one guide element fitting around the guide rod.

These measures result in the achievement of a number of advantages. For one thing a spatially compact arrangement of the filter plate suspension and guide is achieved so that the guides in no way still impede operation of the filter press, for example when changing the filter cloth. The guides are located a clear distance from the filter plates and thus outside the area of exposure to the filter medium, so that they remain protected against contamination and corrosive attack. Integrating the guide into the filter plate suspension eliminates the need for special machining on the filter plate. In addition, the guide permits certain intrinsic deformations of the entire filter plate package, but reliably ensures that adjacent filter plates remain aligned flush with one another when the filter press is closed in such fashion that the sealing edges of the filter plates always join one another to a sufficient degree to seal off the filter chambers.

A provision can be made in constructing the invention such that the guide rod is disposed immediately laterally next to one of the outside lower flanges of the guide rods. Alternatively however, according to the invention, provision can also be made such that the guide rod is disposed above the horizontal plane defined by the rollers, on the outside next to the guide members, and such that the yoke piece is provided with an arm which supports the guide element and fits around the lower flange of one of the guide members. In this manner, an increased distace between the filter plate suspension and the guide is achieved. The guide element can be disposed on the filter plate plane. An even greater distance between the filter plate suspension and the guide can be achieved in another embodiment of the invention by virtue of the fact that the guide element is disposed in a vertical plane which is staggered with respect to the plane of the filter plate.

According to the invention, one guide rod can be disposed on either side of the guide member and each yoke piece can have two guide elements which are staggered opposite to the staggering direction of the rollers relative to the filter plate plane. Each of the guide elements located next to one of the guide rods can lie in the same vertical plane as the roller guided on the other guide member. To produce the largest possible spacing relative to the central suspension, the guide rods can be disposed in the upper area of the guide members.

According to other features of the invention, provision can be made such that the guide elements are designed as pipe hangers or as a U-shaped part open at the top.

The guide rods according to the invention may include rods or tubes which are mounted on the support pillars opposite the end plate of the filter plate package and whose freely projecting ends pass through a guide holes in the end plates. Alternatively, the guide rods can consist of tensioned cables fastened to both supporting pillars and passing through a guide hole in the end plate.

The subject matter of the present invention will be described in greater detail below with reference to the accompanying drawings.

DETAILED DESCRIPTION

Figure 1:
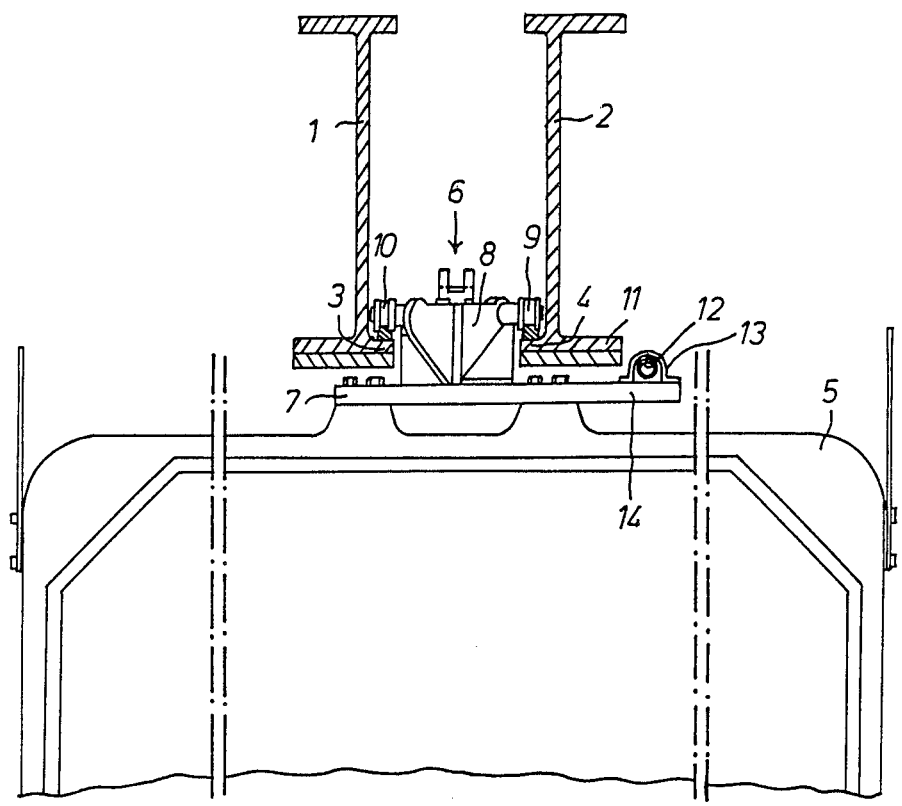
FIG. 1 is a partial cross-sectional view of a filter plate with central suspension and an alignment guide integrated into the suspension for the filter plates according to a first embodiment of the present invention.

Referring now to the drawings wherein like reference numerals are used throughout the various views to designate like parts and, more particularly, to FIG. 1, according to this figure, two guide members 1, 2 constructed as double T-shaped members are supported endwise on two support pillars (not shown), with filter plates 5 being centrally suspended on lower inner flanges 3, 4 of the guide members 1, 2. A yoke piece 6 is threadably secured to the filter plates 5 at the top, with the yoke piece 6 including a lower threaded bar 7 and a substantially triangular plate 8 directed diagonally thereto, on which plate, rollers 9, 10 are disposed with each roller being staggered in opposite directions with respect to a plane of the filter plates 5. Immediately adjacent a lower outer flange 11, a tubular guide rod 12 runs along the guide member 2, with the tubular guide rod 12 being surrounded by a pipe hanger-like guide 13 fastened, for example, by a threaded connection, to an extension 14 of a bar 7 of the yoke piece 6. The filter press is provided, in a conventional manner, on one side with an end plate (not shown) movably mounted on the guide members 1, 2 on which end plate the hydraulic cylinder for closing the filter plate package directly acts or acts by way of tension rods. The guide rod 12 is rigidly attached at one end to the support pillar which is away from the end plate while the other end freely projects and passes through a guide hold in the end plate.

Figure 2:
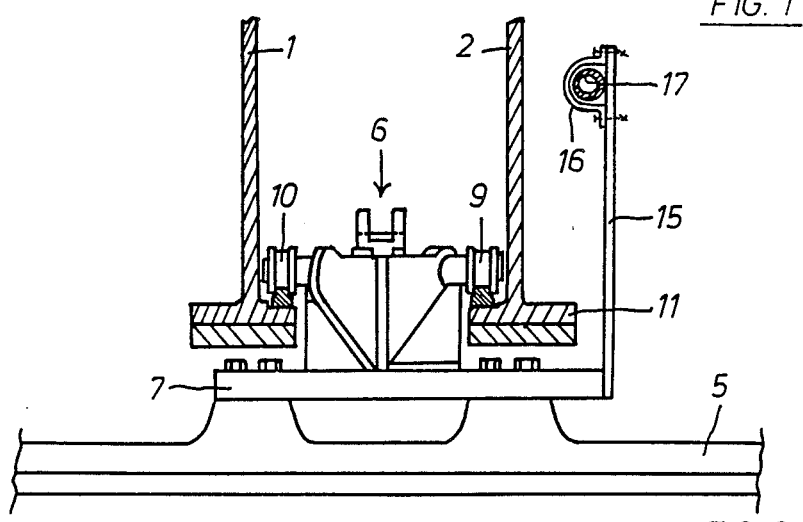
FIG. 2 is a partial cross-sectional view of a second embodiment of the present invention.

In the embodiment according to FIG. 2, an upwardly directed arm 15 is mounted on bar 7 of yoke piece 6. On a side of the arm facing guide member 2 a pipe hanger-shaped guide element 16 is threadably secured at the top, with the element 16 fitting around tubular guide rod 17 mounted approximately halfway up guide members 1, 2.

Figure 3:
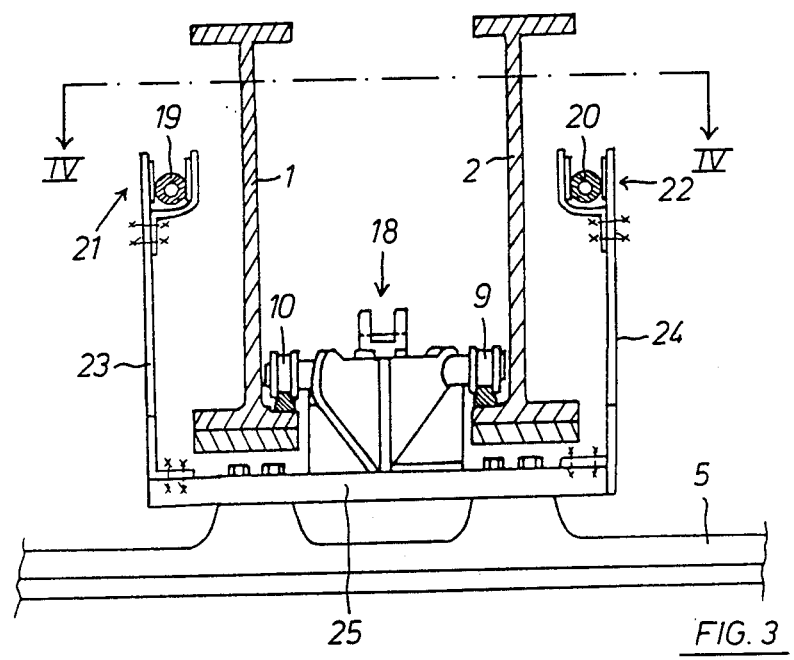
FIG. 3 is a partial cross-sectional view of a third embodiment of the present invention.
Figure 4:
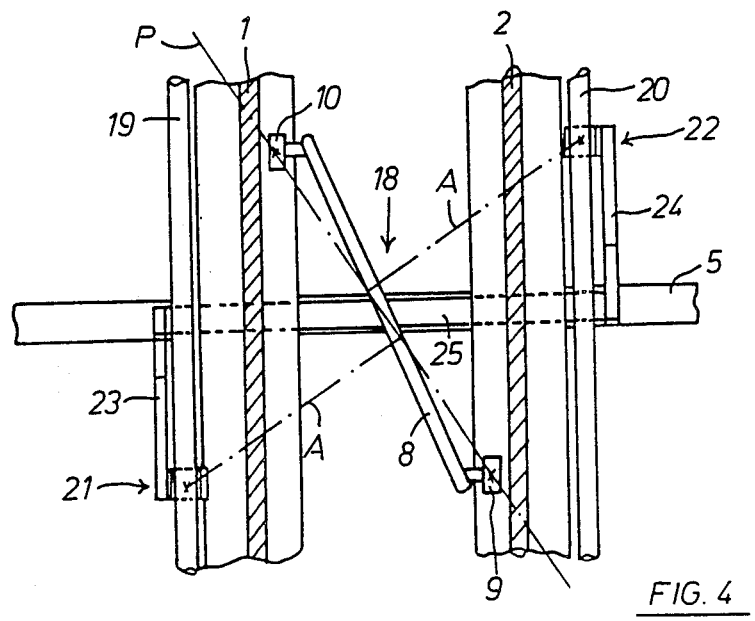
FIG. 4 is a cross-sectional view taken along the line IV—IV in FIG. 3.

In the embodiment in FIGS. 3 and 4, two guide rods 19, 20 are mounted outside next to guide members 1, 2, with each of rods 19, 20 being surrounded by U-shaped guide elements 21, 22 open at the top. Guide elements 21, 22 are each supported by arms 23, 24 which are threaded to the outer ends of bar 25 of yoke piece 18.

While in the embodiments according to FIGS. 1 and 2, guide elements 13, 16 lie within the vertical plane defined by filter plate 5, in the embodiment according to FIGS. 3 and 4 arms 23, 24 are bent opposite to the staggering of rollers 9, 10 in such fashion that guide element 22, which is located outside next to guide member 2, lies in the same vertical plane as the roller 10 guided on the other guide member 1 and by the fact that guide element 21 lies in the same vertical plane as the roller. Guide elements 21, 22 thus have a considerable distance A from the swing axis P of the filter plate defined by the two rollers 9, 10, so that an effective relative alignment of the adjacent filter plates is ensured by guide rods 19, 20 when the filter press is closed or opened.

We claim:

1. Filter press comprising filter plates and an end plate, two parallel double T-shaped guide members having inner flanges from which the end plate and filter plates are centrally suspended, support pillar means supporting the guide members, two rollers mounted on a yoke piece attached to a top of the filter plates, said rollers being staggered in an opposite direction relative to a plane of the filter plate, a guide device for preventing a swinging of the filter plates, the guide device including at least one guide rod extending along said guide members, said at least one guide rod being elastically flexible to a limited degree, said yoke piece being provided with at least one guide element extending around the guide rod, and wherein a bar means is provided on which the yoke piece and supporting rollers are mounted, said bar means being secured substantially centrally of an upper edge of the filter plate.

2. Filter press according to claim 1, wherein the guide rod is disposed directly laterally next to one outer lower flange of the guide members, and wherein one end of said guide rod is rigidly attached to said support pillar means and an opposite end freely projects through a guide hole provided in the end plate.

3. Filter press according to claim 1, wherein the guide rod is disposed above a horizontal plane defined by the roller next to said guide members on an outside thereof and when the beam means is provided with an arm which extends around a lower flange of one of the guide members and supports said guide element.

4. Filter press according to one of claims 2 or 3, wherein the guide element is disposed in the plane of the filter plate.

5. Filter press according to one of claims 2 or 3, wherein the guide element is disposed in a vertical plane which is staggered with respect to a plane of the filter plate.

6. Filter press according to claim 5, wherein one guide rod is disposed on either side of the guide members and wherein the yoke piece has two guide elements which are staggered opposite to the staggering direction of the rollers with respect to the plane of the filter plate.

7. Filter press according to claim 6, wherein each of the guide elements located next to one of the guide members has the roller guided on the other guide member in the same vertical plane.

8. Filter press according to claim 6, wherein the guide rods are disposed in an upper area of the guide members.

9. Filter press according to claim 1, wherein the guide elements are constructed as U-shaped parts open at a top thereof.

10. Filter press according to claim 1, wherein the at least one guide rod consist includes tensioned cables fastened to the support pillar means and passes through a guide hole in the end plate.

* * * * *